(12) United States Patent
Plant

(10) Patent No.: US 6,494,536 B2
(45) Date of Patent: Dec. 17, 2002

(54) PASSENGER SEAT WITH VARIABLE LENGTH SEAT BOTTOM

(75) Inventor: Tommy G. Plant, Winston-Salem, NC (US)

(73) Assignee: B E Aerospace, Inc., Wellington, FL (US)

( * ) Notice: Subject to any disclaimer, the term of this patent is extended or adjusted under 35 U.S.C. 154(b) by 52 days.

(21) Appl. No.: 09/760,033

(22) Filed: Jan. 12, 2001

(65) Prior Publication Data

US 2001/0033101 A1 Oct. 25, 2001

Related U.S. Application Data

(60) Provisional application No. 60/176,366, filed on Jan. 14, 2000.

(51) Int. Cl.[7] ............................................... A47C 3/025
(52) U.S. Cl. ............................. 297/284.11; 297/354.13; 297/342; 297/318; 297/84; 297/423.36
(58) Field of Search ...................... 297/284.11, 284.1, 297/318, 317, 75, 84, 83, 354.13, 342, 423.26, 423.34, 423.36

(56) References Cited

U.S. PATENT DOCUMENTS

| | | | |
|---|---|---|---|
| 2,681,691 A | * | 6/1954 | Maurer |
| 5,058,954 A | * | 10/1991 | Kan-Chee |
| 5,120,107 A | * | 6/1992 | Rogers, Jr. |
| 5,509,722 A | | 4/1996 | Beroth |
| 5,560,681 A | | 10/1996 | Dixon et al. |
| 5,636,898 A | | 6/1997 | Dixon et al. |
| 5,904,401 A | * | 5/1999 | Alberda et al. |
| 5,971,475 A | * | 10/1999 | Lawson et al. |
| 6,109,693 A | * | 8/2000 | Bauer et al. |
| 6,237,994 B1 | * | 5/2001 | Bentley et al. |
| 6,352,307 B1 | * | 3/2002 | Engman |
| 6,352,309 B1 | * | 3/2002 | Beroth |

* cited by examiner

Primary Examiner—Milton Nelson, Jr.
(74) Attorney, Agent, or Firm—Adams, Schwartz & Evans, P.A.

(57) ABSTRACT

A reclinable passenger seat having a seat frame mounting a seat bottom, a seat back extending upwardly from the seat bottom, and a seat bottom/seat back articulation assembly for simultaneously varying the adjustment of the seat bottom and seat back relative to each other. A translation linkage is provided for mounting the seat bottom and seat back for translating movement of the seat bottom relative to the seat back as the seat back is reclined from an upright position and raised to an upright position. The translation linkage extends the effective length of the seat bottom relative to the seat back to provide additional support to the buttocks and legs of the seated passenger.

6 Claims, 15 Drawing Sheets

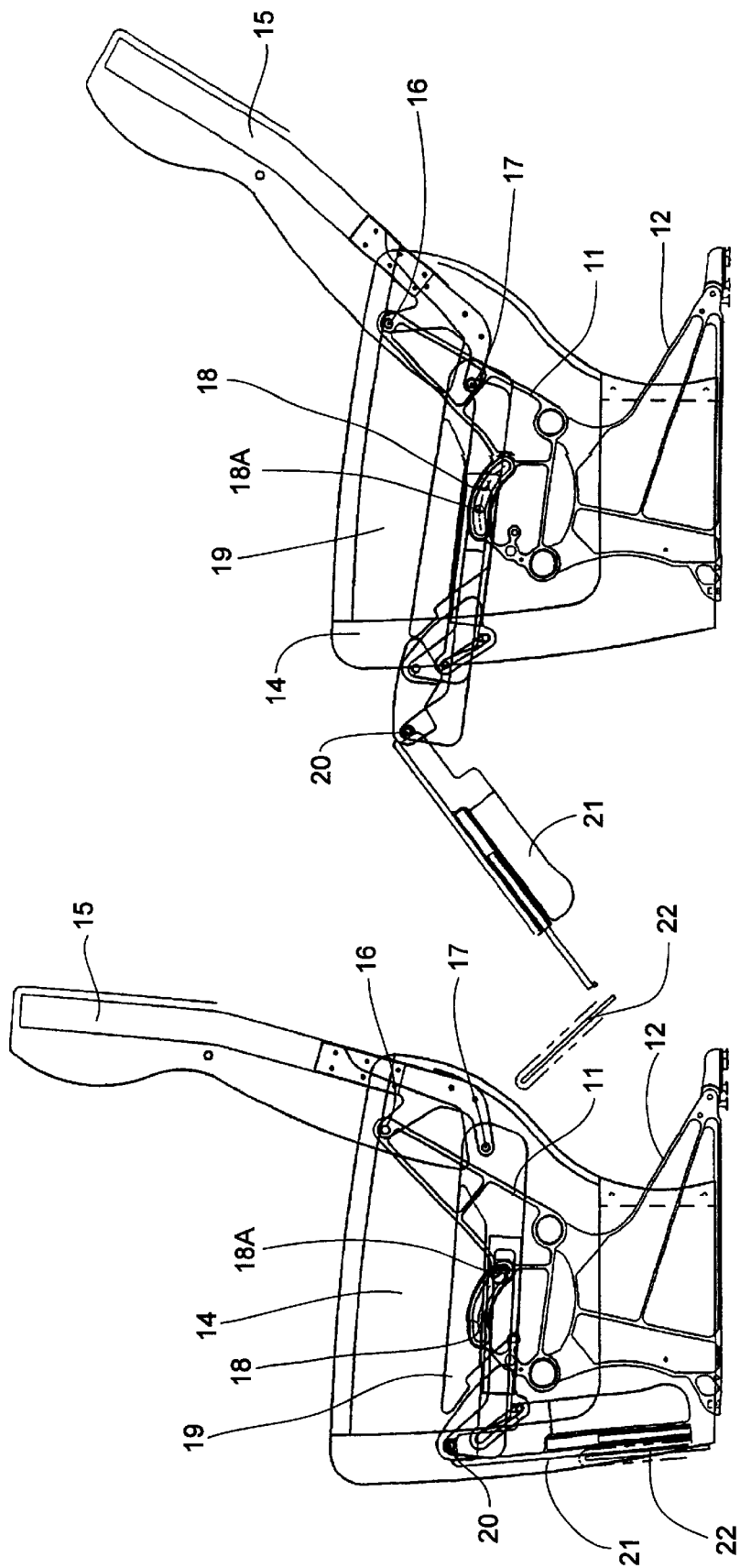

PASSENGER SEAT WITH VARIABLE LENGTH SEAT BOTTOM

PRIORITY CLAIM

The application claims priority from Provisional Patent Application Ser. No. 60/176,366, filed Jan. 14, 2000.

TECHNICAL FIELD AND BACKGROUND OF THE INVENTION

This invention relates to a passenger seat, such as is used on public transportation such aircraft, trains and buses. The invention has particular application aircraft, where passenger seats must be quickly and safely moveable between an upright landing and take-off position, an intermediate recline position and a fully reclined sleep position. Seats must also accommodate a wide variety of passenger sizes and weights. Proper leg support is particularly important on long flights, where improper seat support can cause discomfort and swelling in the lower extremities.

SUMMARY OF THE INVENTION

It is an object of the invention to provide a passenger seat which is comfortable.

It is another object of the invention to provide a passenger seat which provides a combination of articulating movements which is space-efficient.

It is another object of the invention to provide a passenger seat which is lightweight.

It is another object of the invention to provide a passenger seat which has an extensible legrest.

It is another object of the invention to provide a passenger seat which has a combination of pivoting and translational movement which optimizes adjustment of the seat with an economical use of space.

These and other objects of the present invention are achieved in the preferred embodiments disclosed below by providing a reclinable passenger seat having a seat frame mounting a seat bottom, a seat back extending upwardly from the seat bottom, and a seat bottom/seat back articulation assembly for simultaneously varying the adjustment of the seat bottom and seat back relative to each other. A translation linkage is provided for mounting the seat bottom and seat back for translating movement of the seat bottom relative to the seat back as the seat back is reclined from an upright position and raised to an upright position. The translation linkage extends the effective length of the seat bottom relative to the seat back to provide additional support to the buttocks and legs of the seated passenger.

According to one preferred embodiment of the invention, the translation linkage is adapted to initially raise a front end of the seat bottom into a recline position and subsequently lower the front end of the seat bottom into a sleep position wherein the seat bottom is in substantially the same plane as the seat back.

According to another preferred embodiment of the invention, the translation linkage includes a slot carried on the seat frame and cooperating with a pin carried by the seat bottom, the slot being curved to cause movement of the pin in the slot as the seat back is reclined to initially raise a front end of the seat bottom into a recline position relative to the seat back and subsequently lower the front end of the seat bottom into a sleep position wherein the seat bottom is in substantially the same plane as the seat back in a fully reclined position.

According to yet another preferred embodiment of the invention, a bolster is positioned in a position foreward of the seat bottom for providing additional support to the legs of the passenger.

According to yet another preferred embodiment of the invention, means are provided for moving the bolster into and out of a position forward of the seat bottom and to the rear of a extendable leg rest assembly.

According to yet another preferred embodiment of the invention, the seat includes an extendable legrest.

According to yet another preferred embodiment of the invention, the legrest is movable relative to the seat bottom for providing a longer effective leg-supporting length to the passenger.

According to yet another preferred embodiment of the invention, the invention includes a bolster mounted for movement between a stowed position and a use position between the front end of the seat bottom and an uppermost end of the legrest.

BRIEF DESCRIPTION OF THE DRAWINGS

Some of the objects of the invention have been set forth above. Other objects and advantages of the invention will appear as the invention proceeds when taken in conjunction with the following drawings, in which:

FIGS. 14A–14C are simplified vertical cross-sections of the seat shown in FIG. 1 in the landing/takeoff, recline and sleeper positions.

DESCRIPTION OF THE PREFERRED EMBODIMENT AND BEST MODE

Figure 1:
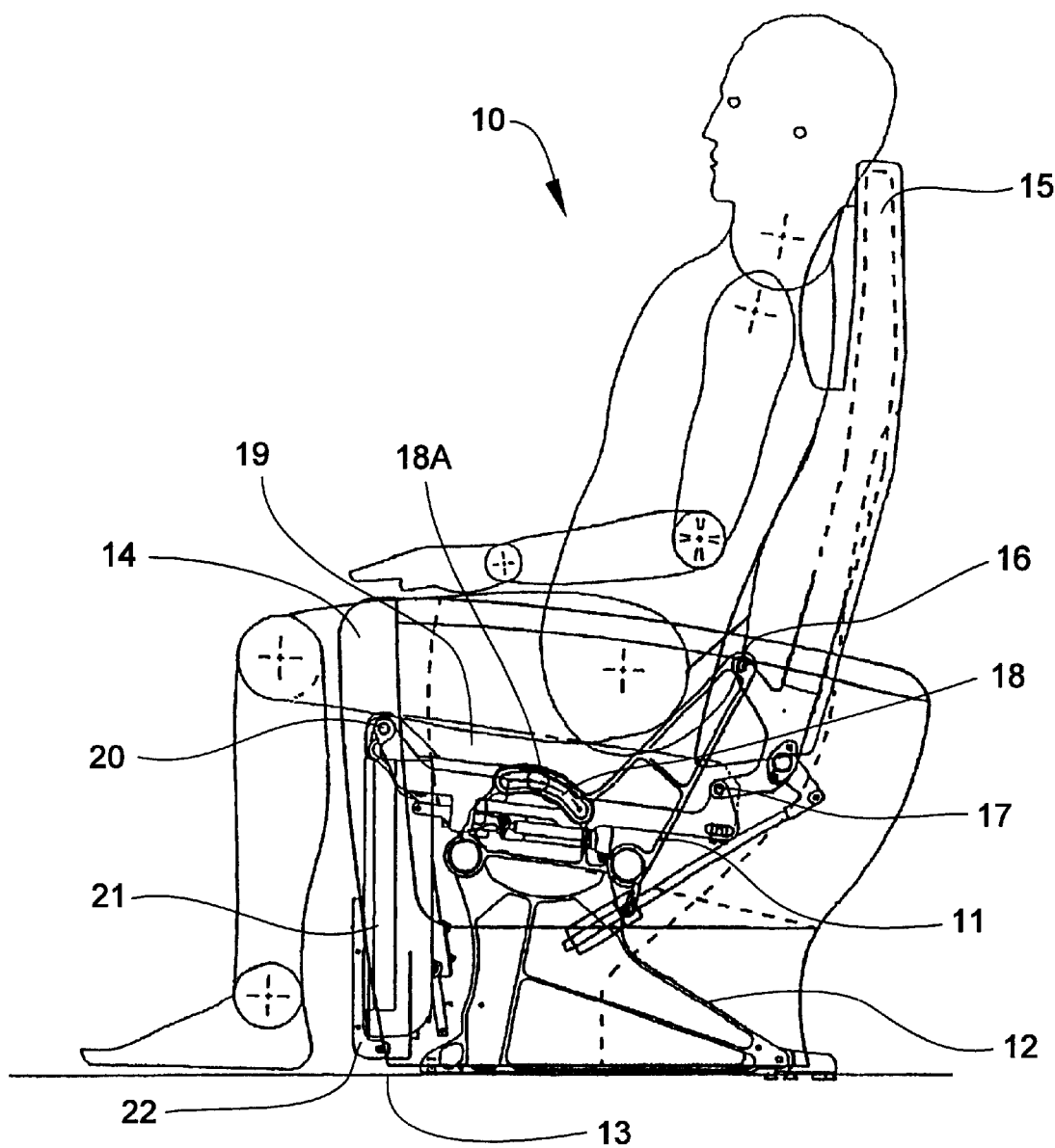
FIG. 1 is a vertical cross-sectional view of a passenger seat according to o embodiment of the invention in a takeoff and landing position.

Referring now specifically to the drawings, a passenger seat according to the present invention is illustrated in FIG. 1 and shown generally at reference numeral 10.

The passenger seat 10 includes a seat frame 11 which is attached to a track 13 mounted on the deck of an airplane.

Attachment is made by use of track fittings, such as those disclosed in applicant's U.S. Pat. Nos. 5,169,091, 5,178,346 or 5,861,318. The seat frame 11 includes horizontally spaced spreaders 12 which include seat pan articulation slots 18. The seat back 15 is attached to the seat frame 11 at back pivot location 16 and to the seat pan 19 at seat pan pivot 17. The seat pan 19 is attached to the seat frame spreaders 12 at the seat pan articulation slot 18. The legrest 21 is attached to seat pan 19 at legrest pivot 20. A footrest 22 extends out of legrest 21. The seat endbay and consoles 14 bound the occupant on each side.

Figure 2:
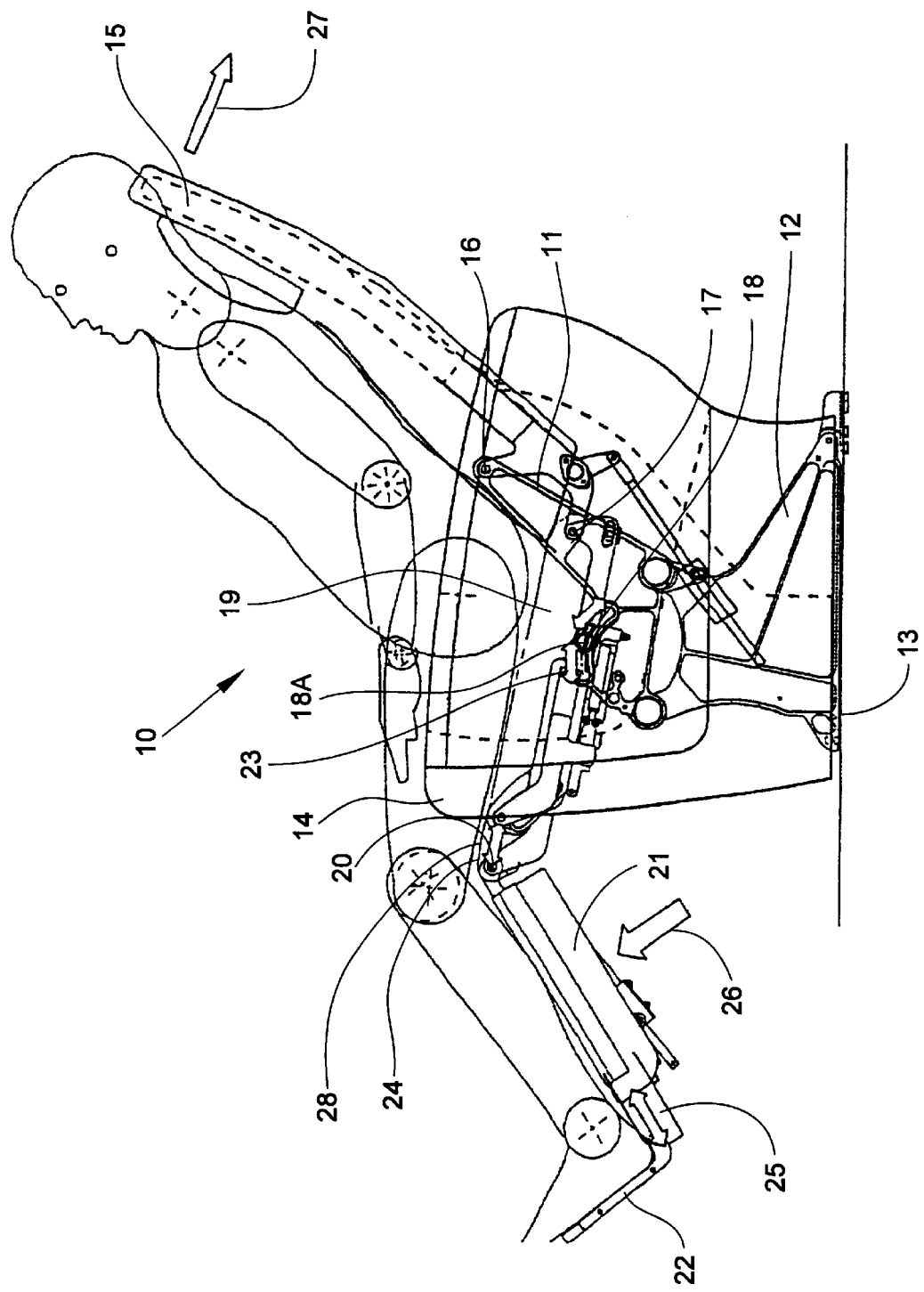
FIG. 2 is a vertical cross-sectional view of the passenger seat of FIG. 1 in a recline position.

As shown in FIG. 2, the seat 10 is capable of articulating into several positions. The seat back articulation occurs by rotation about seat back pivot 17. Seat back articulation drives the seat pan 19 by seat pan pivot 17 and seat pan articulation slot 18. As the seat pan articulates, the position and angle of the seat pan is controlled by the location of the seat pan pivot 17 and the seat pan 19 within the seat pan articulation slot 18. The seat pan 19 also includes seat pan extension 24 which raises and lowers an extra support cushion 28 via slots included in the frame of seat pan 19. Legrest articulation 26 is possible by pivoting about legrest pivot 20. Legrest extension 25 is also possible by extending footrest 22 via a slide mechanism. The legrest 21 and footrest 22 support surfaces consist of a fabric diaphragm suspended between frame supports on each side. The footrest 22 slides into and out of the end of legrest 21.

Figure 4:
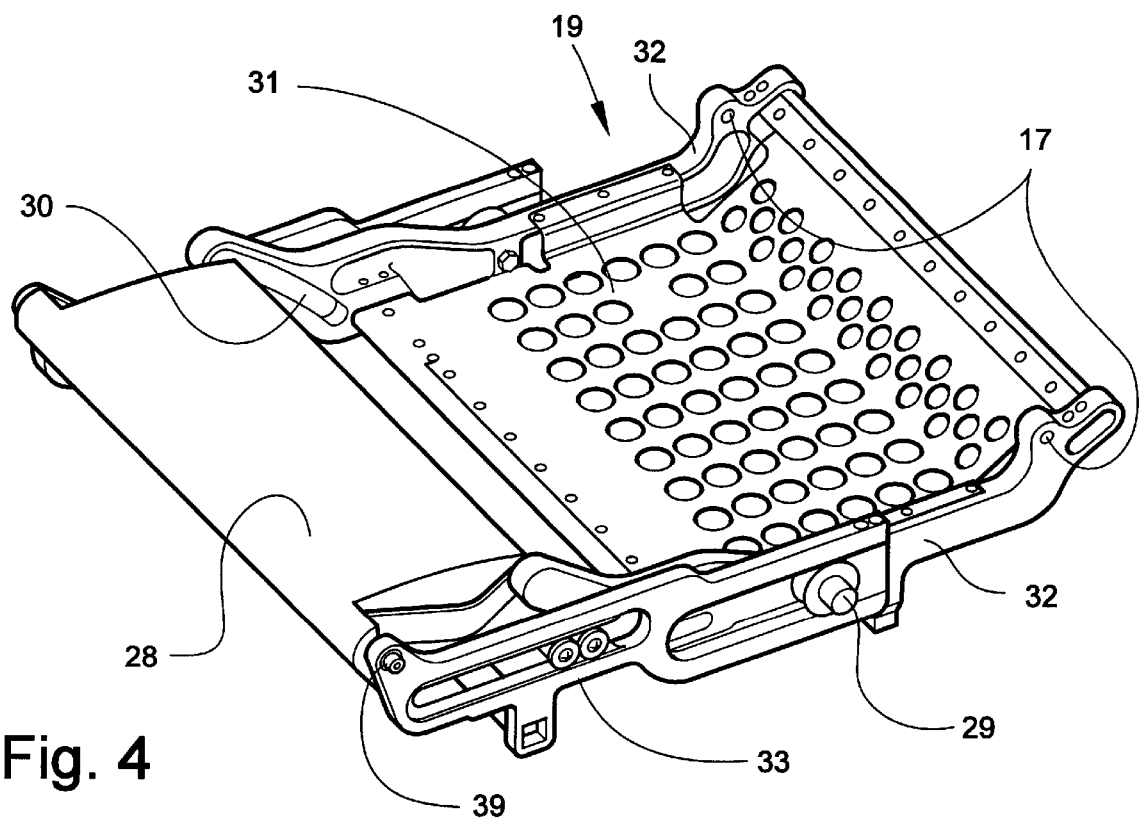
FIG. 4 is a fragmentary view of the seat pan of the seat shown in FIG. 1 in a recline position.
Figure 5:
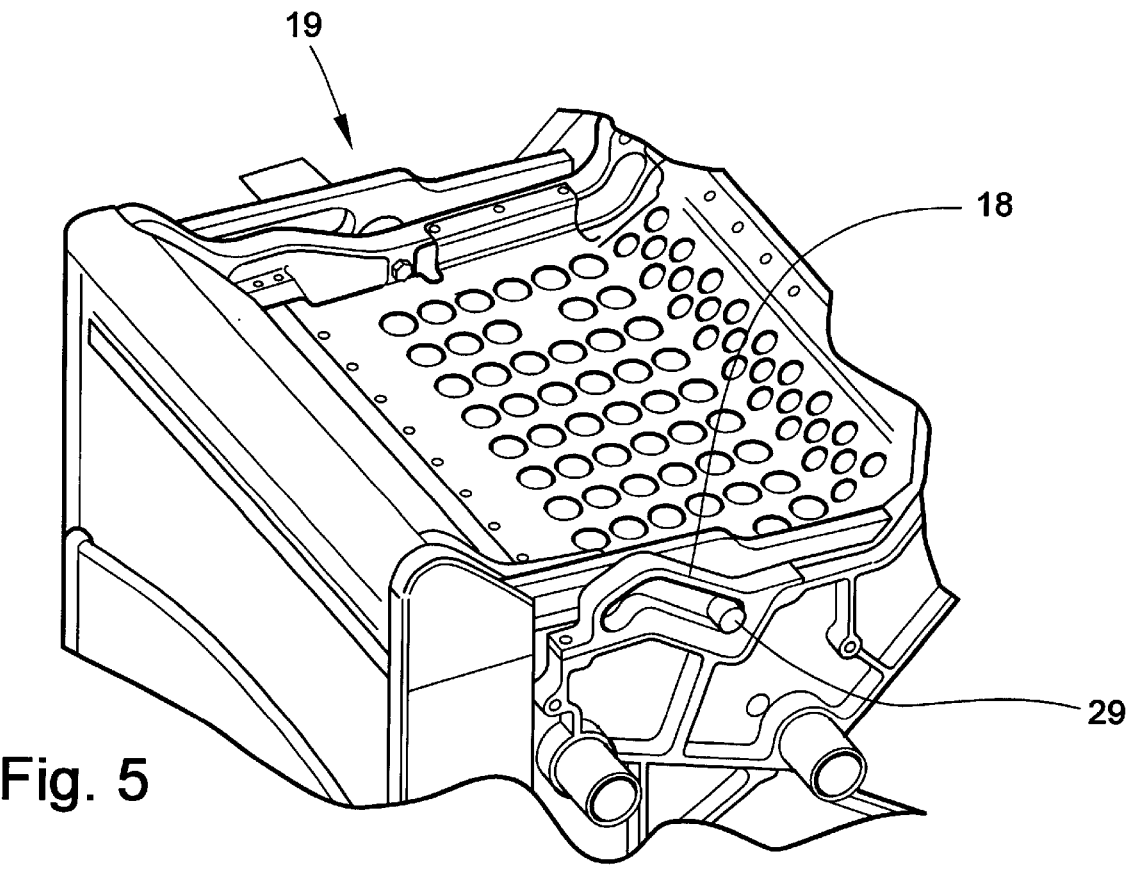
FIG. 5 is a fragmentary view of the seat pan of the seat shown in FIG. 1 in a landing and takeoff position.

Referring to FIGS. 4 and 5, the seat pan 19 includes a seat pan diaphragm 31 attached between two seat pan rails 32 and an additional extra support cushion 28 which can be articulated fore/aft by movement of the seat pan extension rail 33. Upon fore/aft movement of the seat pan extension rail, extra support cushion 28 articulates upward in extra support cushion articulation slot 30. Overall positioning of the seat pan 19 is driven by the location of seat pan pivots 17 which are connected to seat back 15, and by the location of cam followers 29, which move inside seat pan articulation slot 18.

Figure 6:
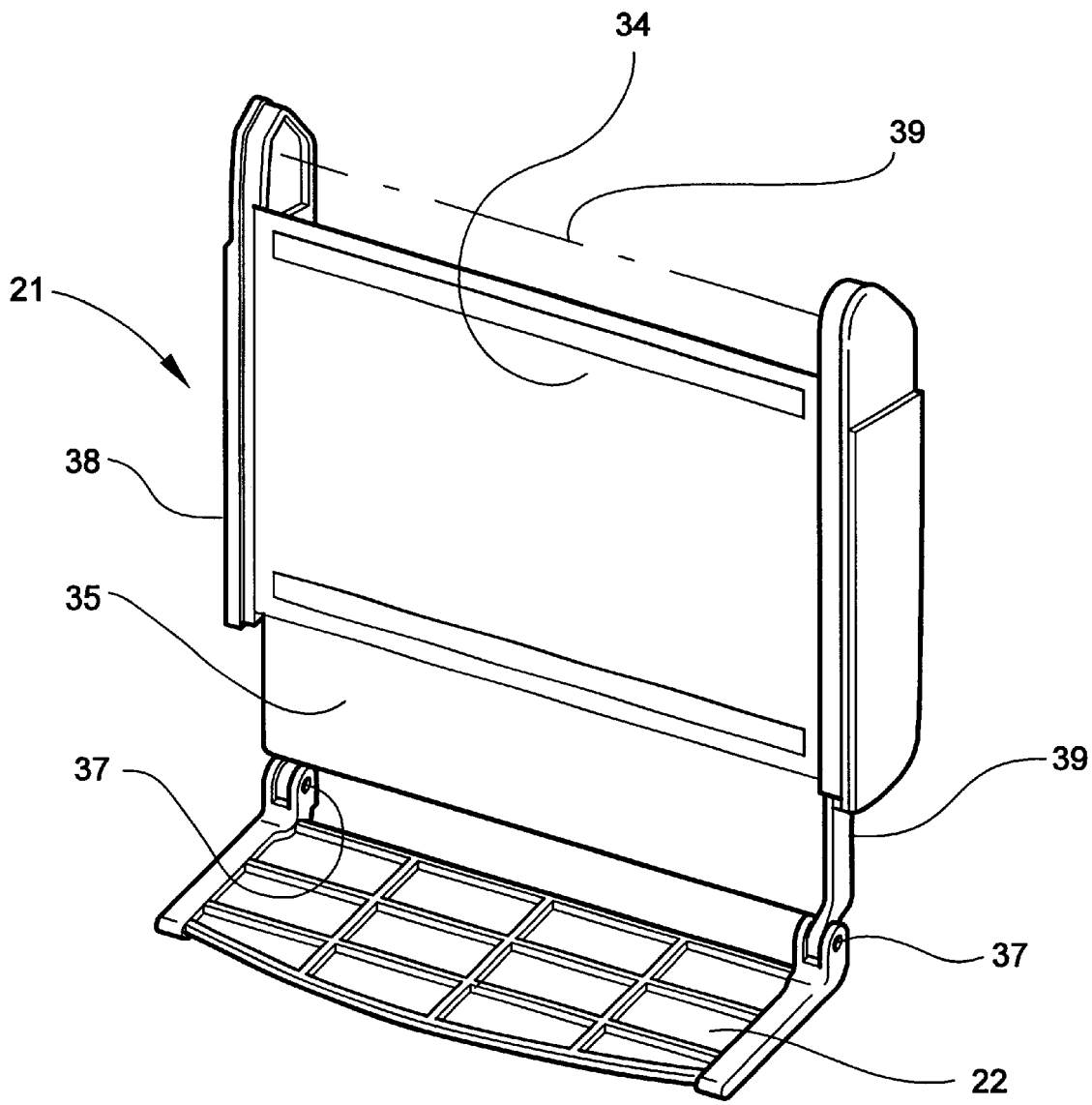
FIG. 6 is a view of the legrest and footrest portion of the passenger seat shown in FIG. 1.

Referring to FIG. 6, legrest assembly 21 consists of a legrest diaphragm 34 suspended between legrest support rails 38 and an additional legrest extension diaphragm 35 suspended between footrest rails 39. Footrest 36 is attached at the end of legrest extension rails 39. Legrest 21 (FIG. 1) is connected to seat pan extension rail 33 (FIG. 4) and rotates about legrest pivot location 39. Legrest extension rails 39 slide in and out between legrest support rails 38, which provide additional leg clearance for taller Footrest 36 is attached to legrest extension rails 39 at the footrest pivots 37 and rotates as shown in FIG. 5 to provide support for the passengers feet.

Figure 7:
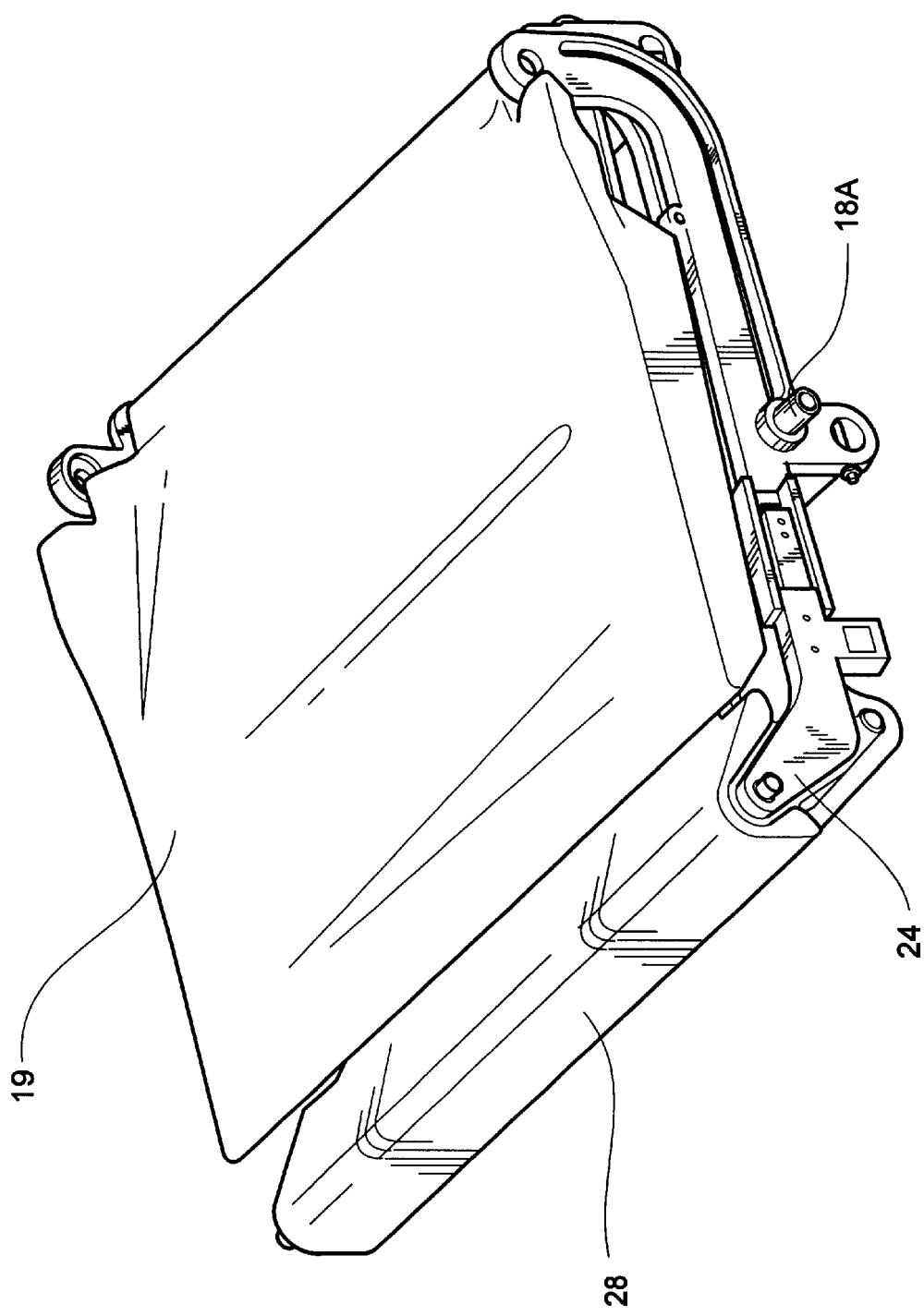
FIG. 7 is a view of the legrest and footrest in the landing and takeoff position.
Figure 8:
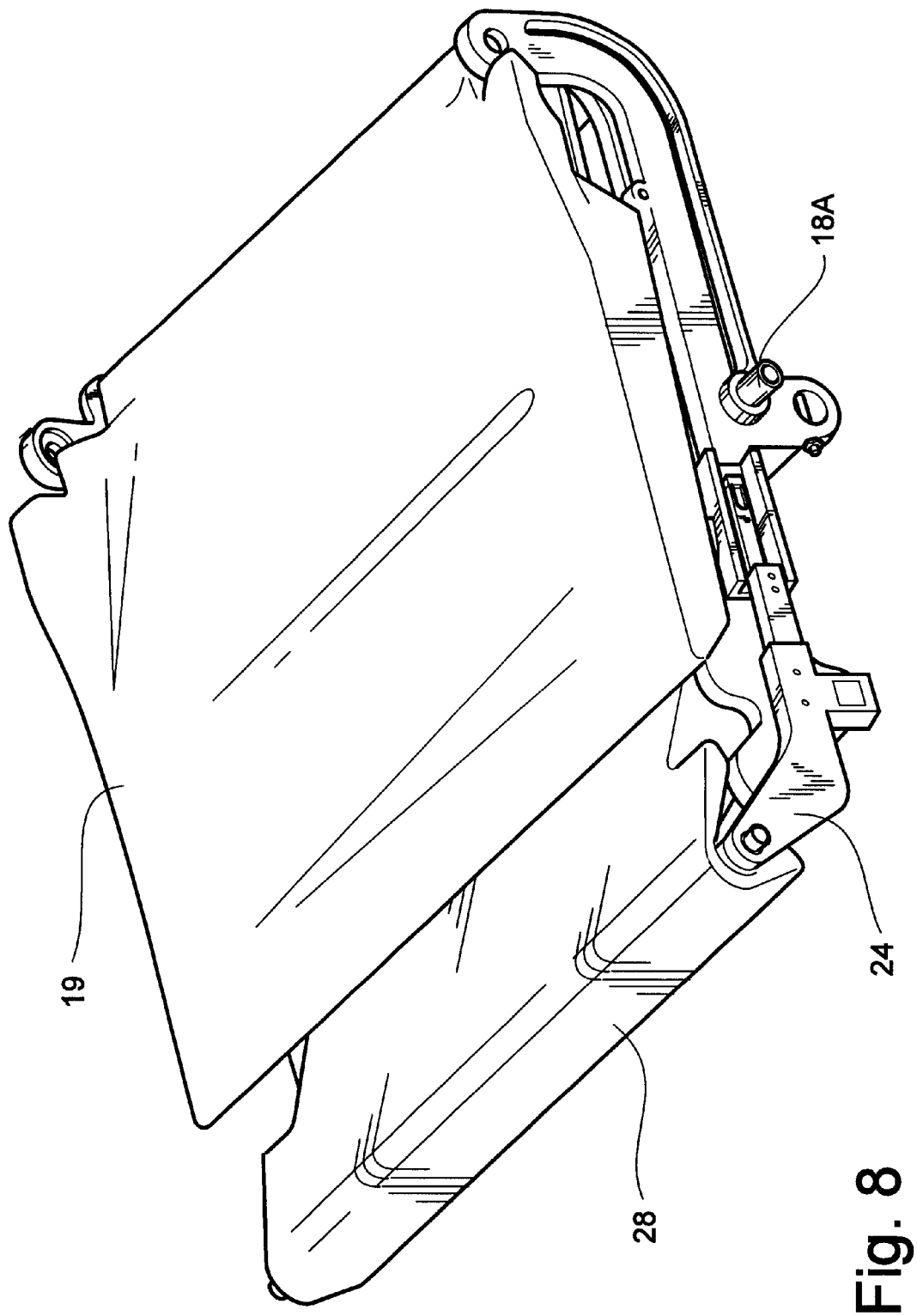
FIG. 8 is a view of the legrest and footrest in the recline position.
Figure 9:
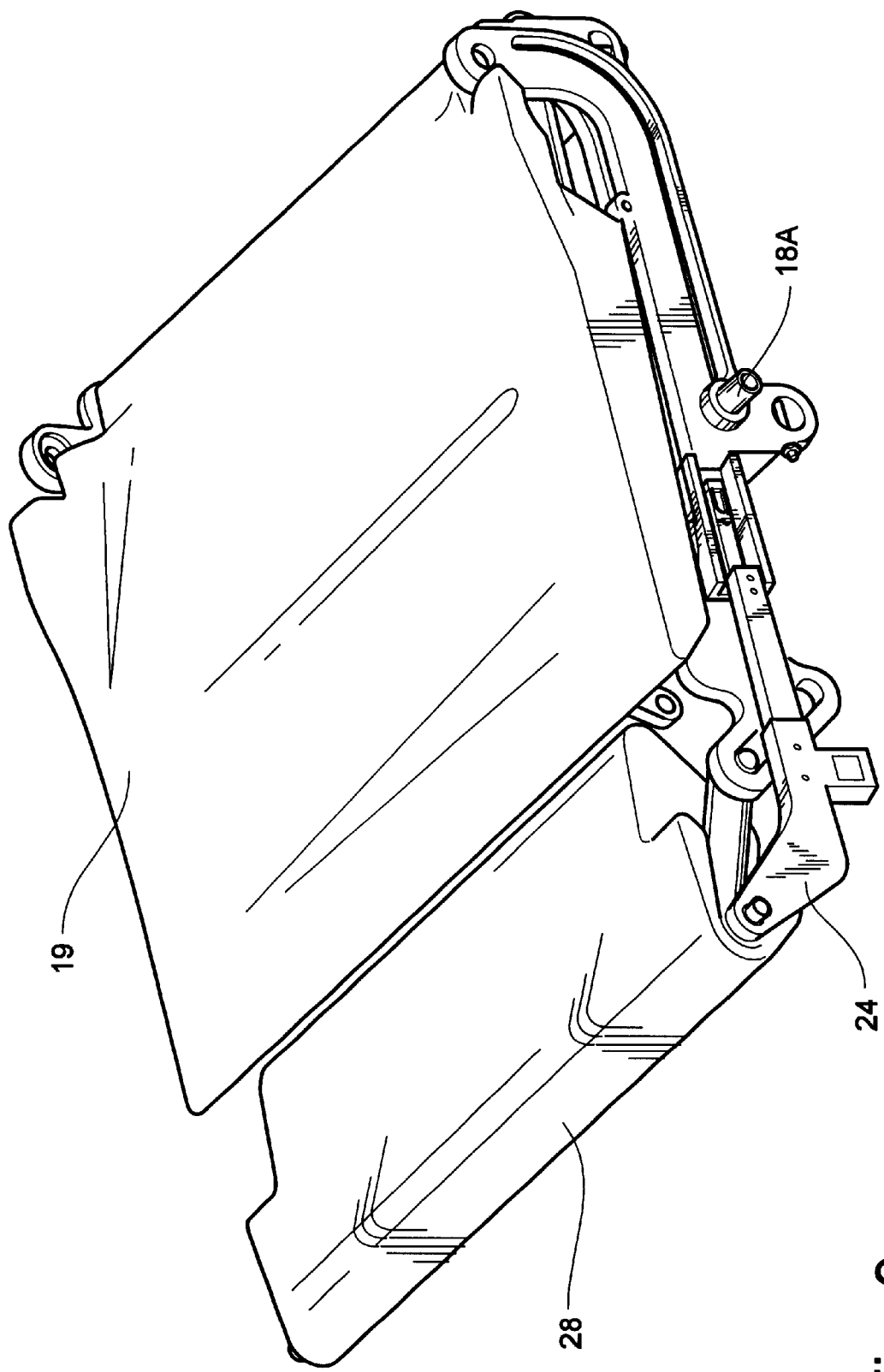
FIG. 9 is a view of the legrest and footrest in the sleeper position.

As is shown in FIGS. 7, 8 and 9, the support cushion 28 extends outwardly from the front end of the seat pan 19 as the seat 10 is progressively reclined.

Figure 10:
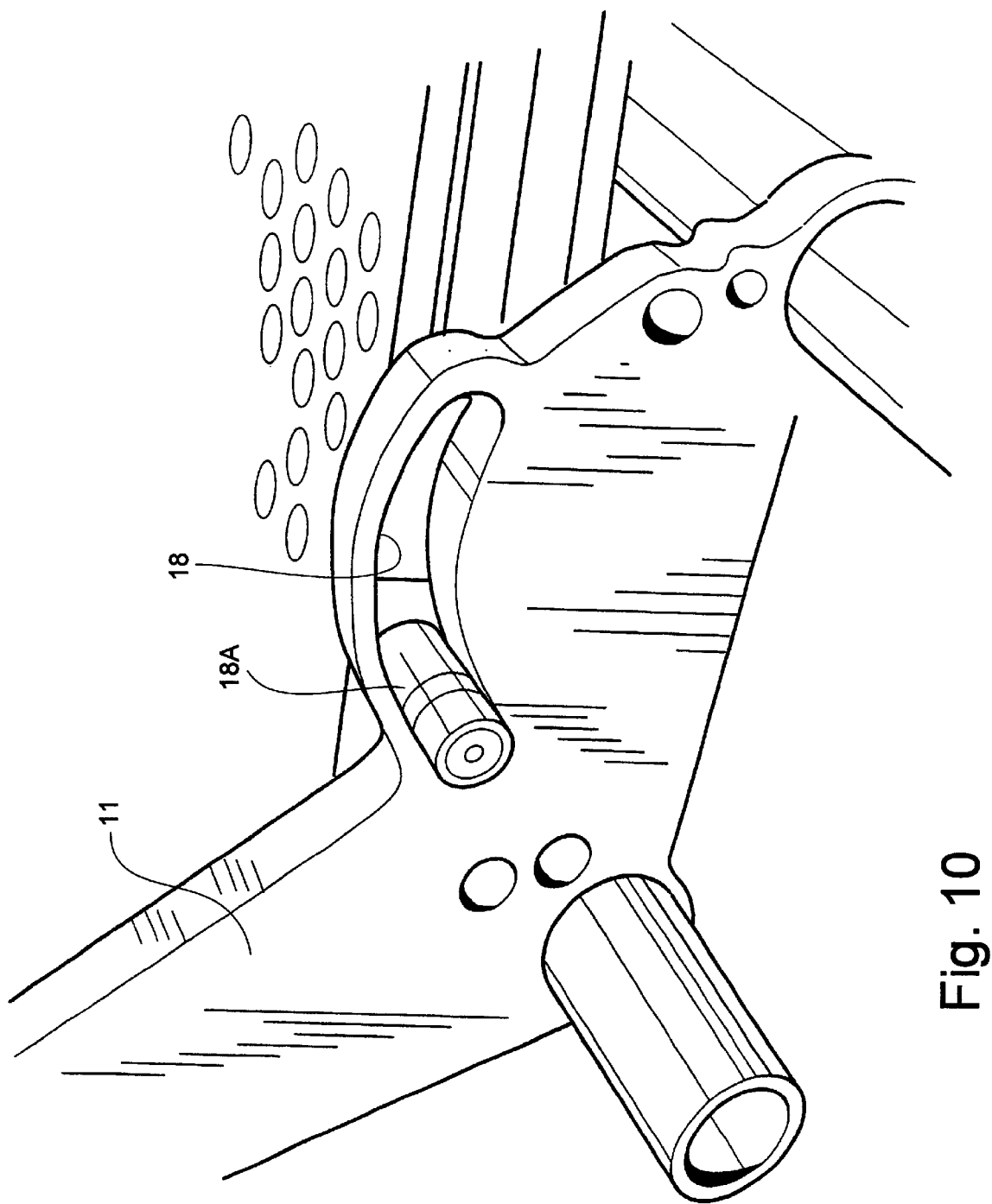
FIG. 10 is a fragmentary view of the seat pan articulation slot in the landing and takeoff position.
Figure 11:
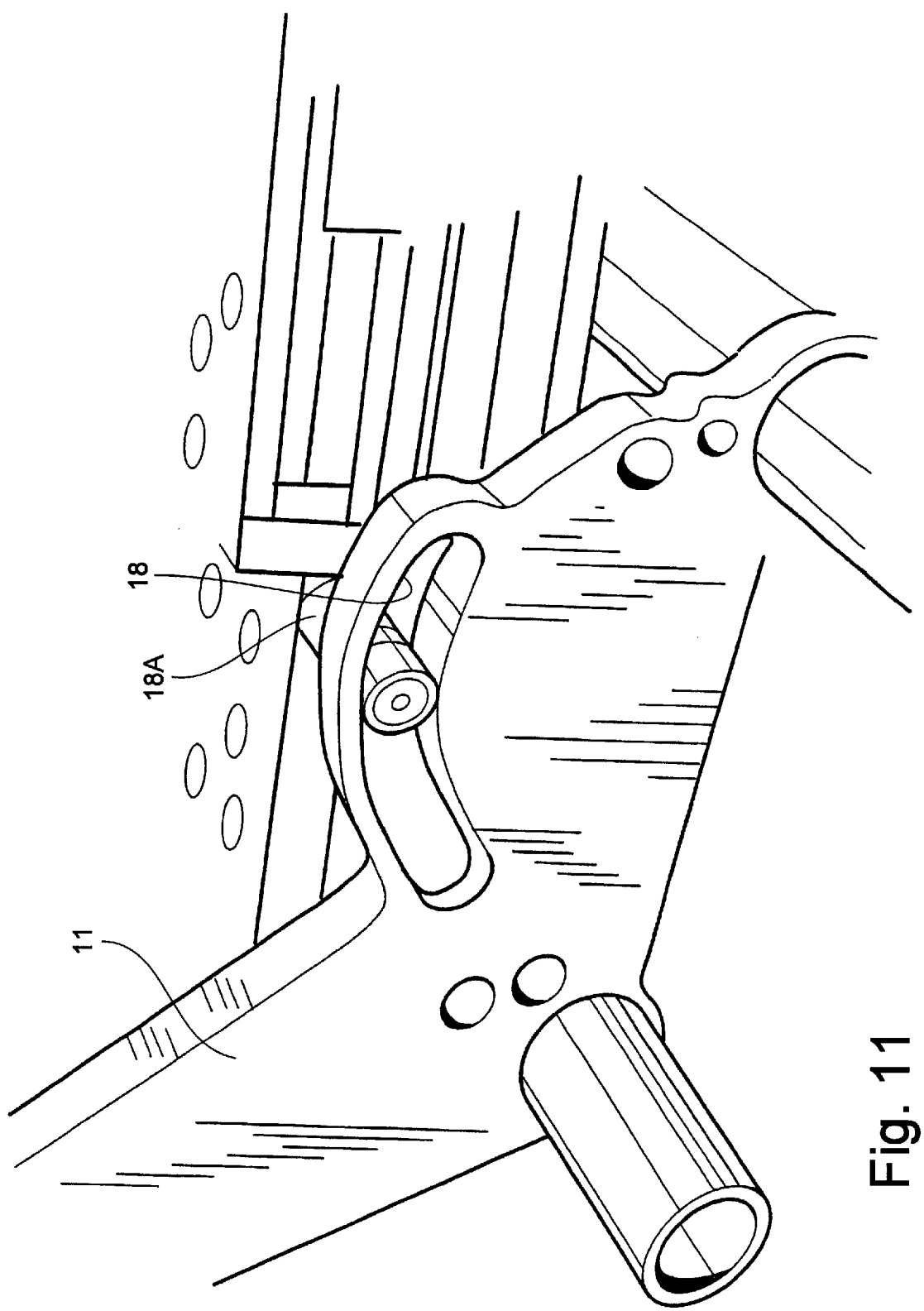
FIG. 11 is a fragmentary view of the seat pan articulation slot in the recline position.

As is shown in FIGS. 10 and 11, a pin 18A captured in seat pan articulation slot 18 controls movement of the seat pan 19 as the seat 10 is articulated.

Figure 12:
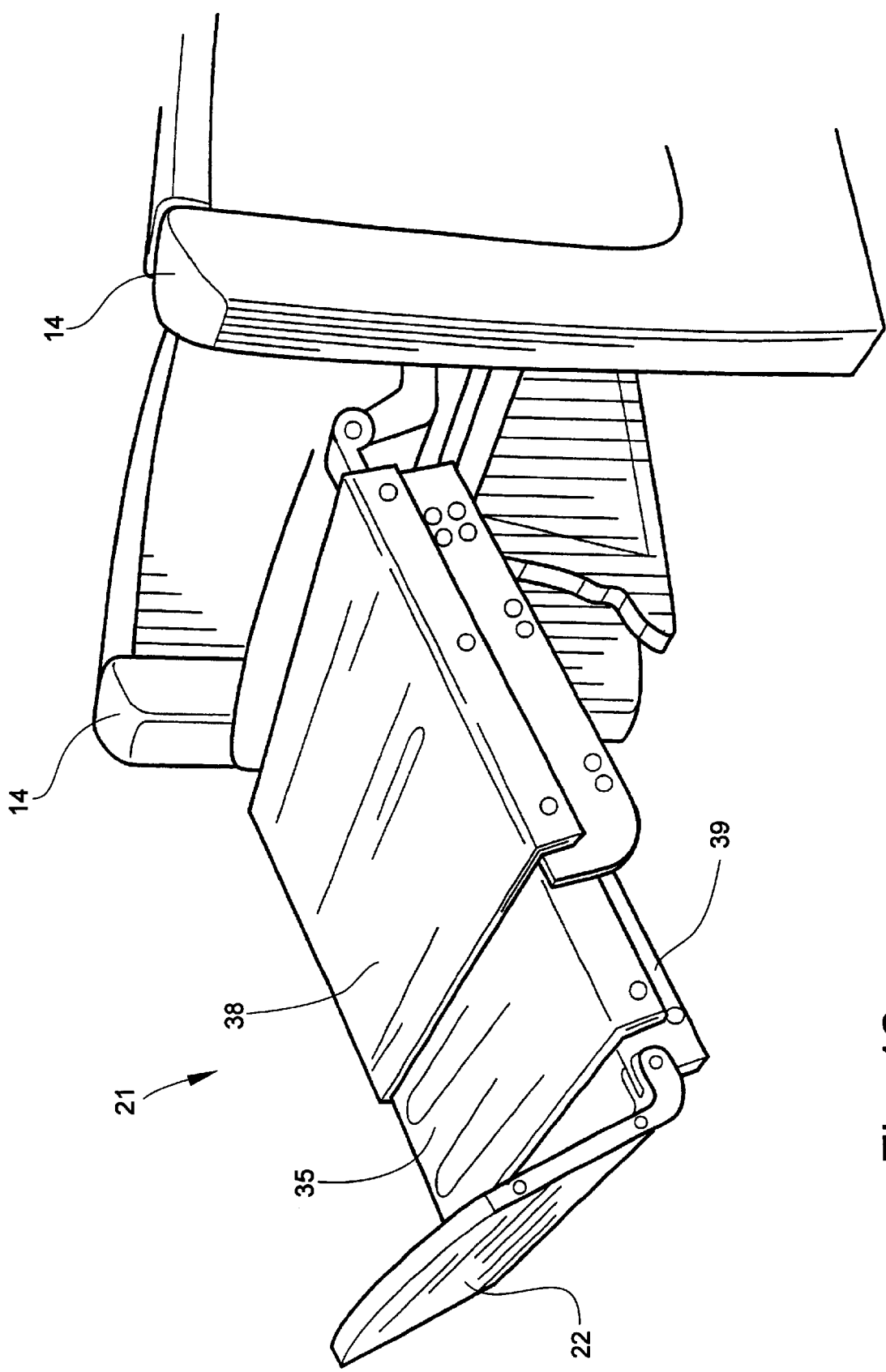
FIG. 12 is a fragmentary view of the seat shown in FIG. 1, showing the extension of the legrest.

Referring now to FIG. 12, the legrest diaphragm 34 and the legrest extension diaphragm 35 telescope to lengthen or shorten the overall length of the legrest 21 as desired by the passenger. The legrest extension diaphragm 35 is nested within the legrest diaphragm 34.

Figure 13A:
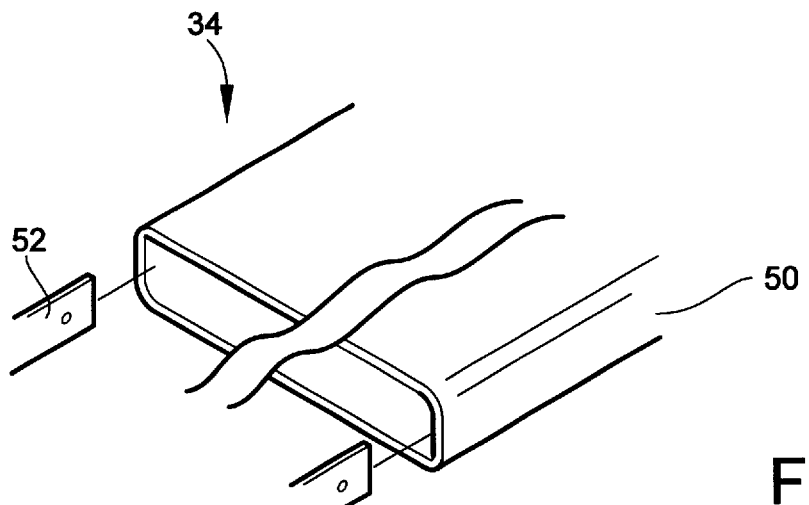
FIGS. 13A–13E are fragmentary views showing the assembly of the fabric legrest.
Figure 13B:
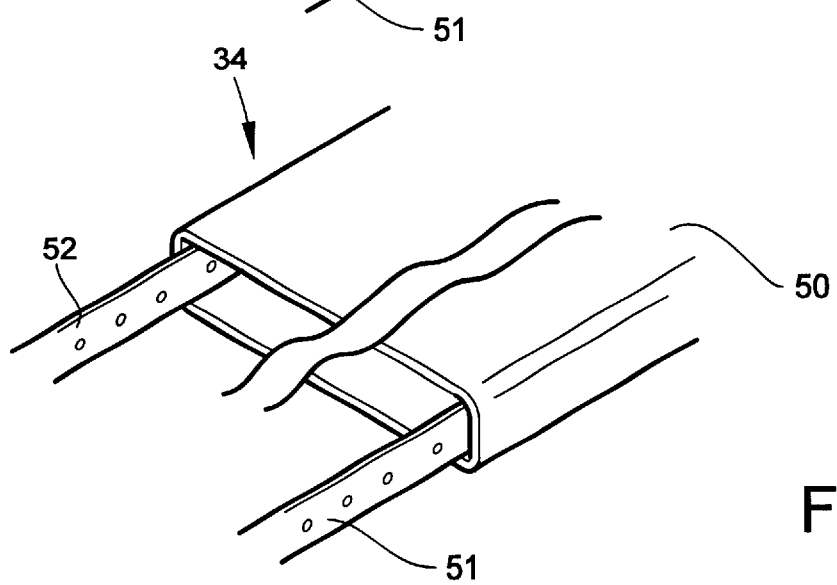
Figure 13C:
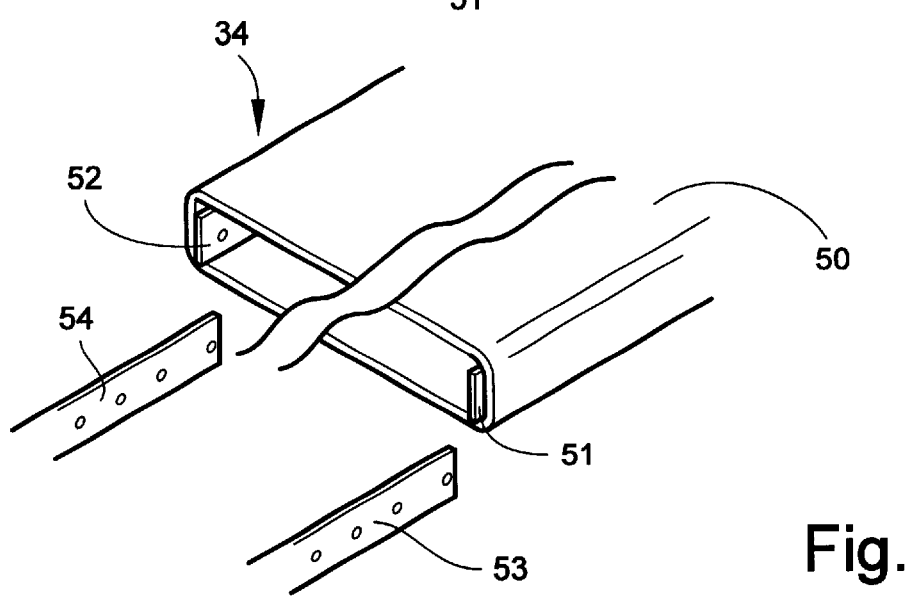
Figure 13D:
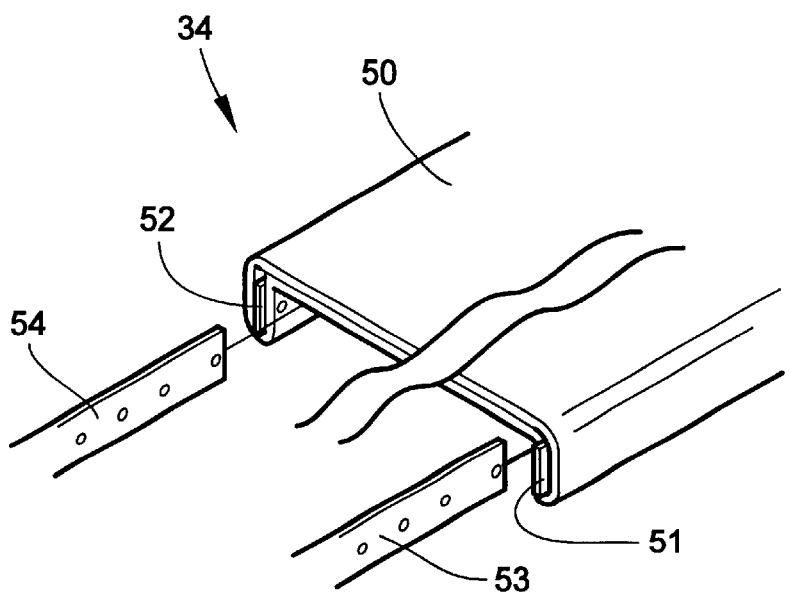
Figure 13E:
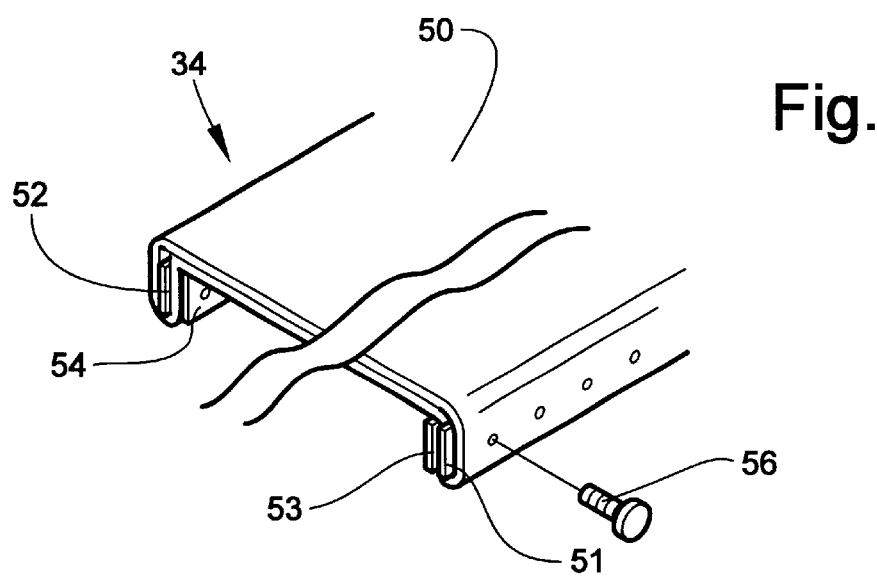

Referring now to FIGS. 13A–E, the legrest diaphragm 34 is assembled by forming a fabric tube 50 (FIG. 13A) and positioning two inner rails 51, 52 therein whereby the tube is maintained in an open condition and gives a specified depth to the tube 50 (FIG. 13B). A second pair of outer rails 53, 54 (FIG. 13C) is then positioned on the outside of the tube 50 adjacent the inner rails 51, 52 (FIG. 13D) and pressed upwardly and into alignment with the inner rails 51, 52, as shown in FIG. 13E. This movement stretches the fabric and provides a taut, resilient double-layer support for the upper legs of the passenger. Suitable fasteners 56 secure the fabric tube in position between the pairs of rails 51, 52, 53, 54, respectively.

The fabric may be a material made by DuPont and sold under the trademark Dymetrol 200, a dense, nylon-based fabric, a unidirectional fabric sold under the trademark Crystal Flex, or any other suitable fabric. Characteristics important in fabric selection include strength, resiliency, wear resistance and resistance to soiling.

Figure 3:
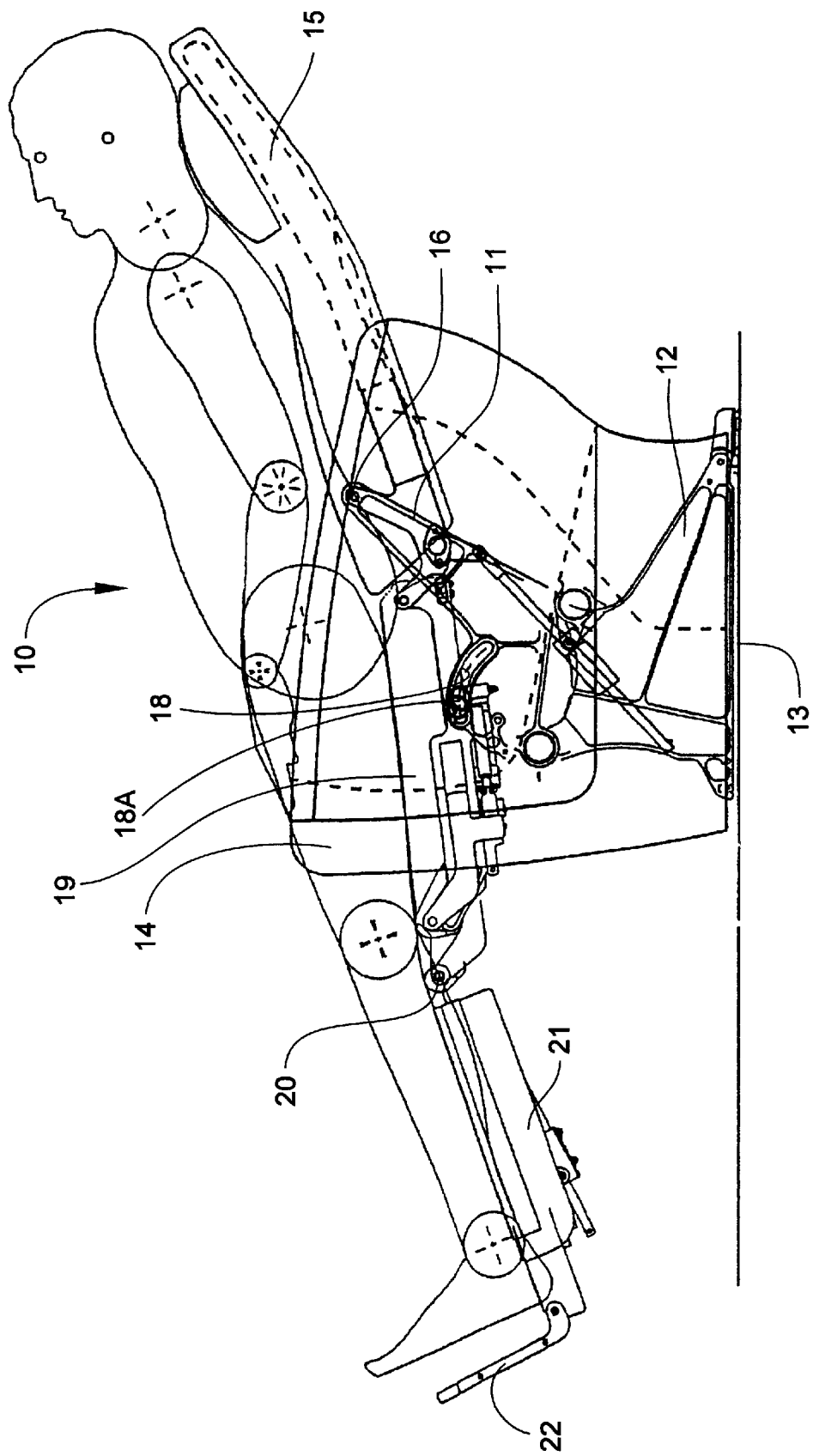
FIG. 3 is a vertical cross-sectional view of a passenger seat of FIG. 1 in a sleeper position.
Figure 14C:
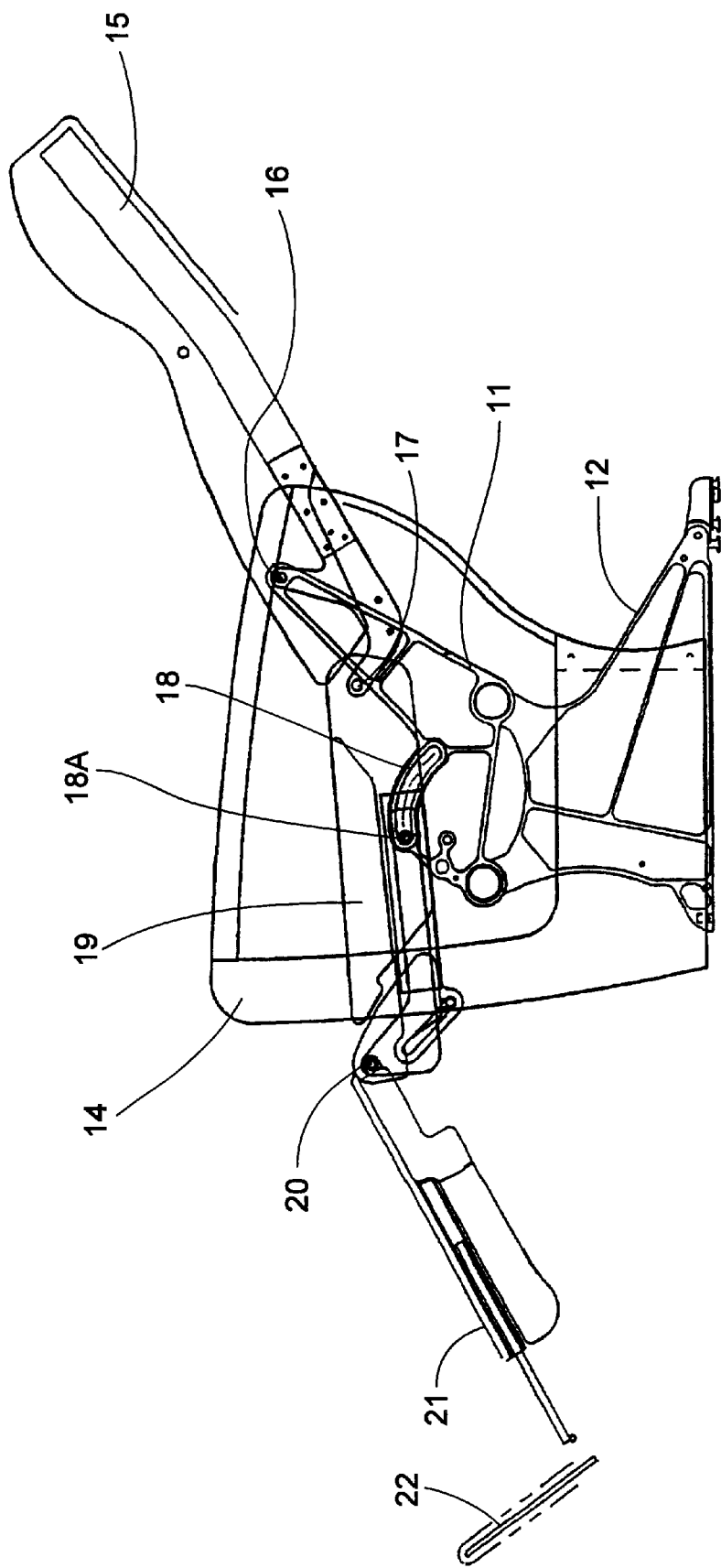

FIGS. 14A–14C illustrate in simplified form the articulation of the seat 10, including the rearward movement of the seat back 15, the forward movement of the seat pan 19 and the extension of the legrest 21. As shown, the seat back 15 is moved by pivotal movement about the back pivot 16. The back of the seat pan 19 is pivoted about the pivot 17. The forward end of the seat pan is translated between the positions shown in FIGS. 14A–14C by movement of pivot pin 18A in slot 18. The curve in the slot 18 provides a slight upward movement to the forward end of the seat pan 19 in the recline position (See FIGS. 2 and 14B) which prevents the passenger from slipping down the seat. In the sleeper position, the seat pan 19 is lowered slightly to more closely align the body of the passenger in a true prone sleeping position. (See FIGS. 3 and 14C).

The seat may be powered by any suitable drive device, such as pneumatic cylinders, a motor-driven worm drive or other types electric motors.

I claim:

1. A reclinable passenger seat having a seat frame mounting a seat bottom, a seat back extending upwardly from the seat bottom, and a seat bottom/seat back articulation assembly for simultaneously varying the adjustment of the seat bottom and seat back relative to each other, and comprising:

(a) a translation linkage mounting said seat bottom and seat back for translating movement of the seat bottom relative to the seat back as the seat back is reclined from an upright position and raised to an upright position, said translation linkage extending an effective length of the seat bottom relative to the seat back to provide additional support to buttocks and legs of a seated passenger;

(b) a bolster positioned in a position forward of the seat bottom for providing additional support to the legs of the passenger; and (c) means for moving the bolster into and out of a position forward of the seat bottom and to the rear of an extendable leg rest assembly.

2. A reclinable passenger seat having a seat frame mounting a seat bottom, a seat back extending upwardly from the seat bottom, and a seat bottom/seat back articulation assembly for simultaneously varying the adjustment of the seat bottom and seat back relative to each other, and comprising a translation linkage mounting said seat bottom and seat back for translating movement of the seat bottom relative to the seat back as the seat back is reclined from an upright position and raised to an upright position, said translation linkage extending an effective length of the seat bottom relative to the seat back to provide additional support to buttocks and legs of a seated passenger and adapted to initially raise a front end of the seat bottom into a recline position and subsequently lower the front end of the seat bottom into a sleep position wherein said seat bottom is in substantially the same plane as the seat back.

3. A reclinable passenger seat having a seat frame mounting a seat bottom, a seat back extending upwardly from the seat bottom, and a seat bottom/seat back articulation assembly for simultaneously varying the adjustment of the seat bottom and seat back relative to each other, and comprising a translation linkage mounting said seat bottom and seat back for translating movement of the seat bottom relative to the seat back as the seat back is reclined from an upright position and raised to an upright position, said translation linkage extending an effective length of the seat bottom relative to the seat back to provide additional support to buttocks and legs of a seated passenger and including a slot carried on the seat frame and cooperating with a pin carried by the seat bottom, said slot being curved to cause movement of the pin in the slot as the seat back is reclined to initially raise a front end of the seat bottom into a recline position relative to the seat back and subsequently lower the front end of the seat bottom into a sleep position wherein said seat bottom is in substantially the same plane as the seat back in a fully reclined position.

4. A reclinable passenger seat according to claim 2 or 3, and including an extendable legrest.

5. A reclinable passenger seat according to claims 4, wherein said legrest is movable relative to the seat bottom for providing a longer effective leg-supporting length to the passenger.

6. A reclinable passenger seat according to claim 5, and including a bolster mounted for movement between a stowed position and a use position between the front end of the seat bottom and an uppermost end of the legrest.

* * * * *